United States Patent
Tanaka et al.

(10) Patent No.: US 9,206,728 B2
(45) Date of Patent: Dec. 8, 2015

(54) CONTROL SYSTEM AND CONTROL METHOD FOR ELECTRICAL HEATING CATALYZER

(71) Applicant: TOYOTA JIDOSHA KABUSHIKI KAISHA, Toyota-shi, Aichi-ken (JP)

(72) Inventors: Hiroshi Tanaka, Susono (JP); Keisuke Nagasaka, Susono (JP); Kazuki Tsurumi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/302,896

(22) Filed: Jun. 12, 2014

(65) Prior Publication Data

US 2015/0007551 A1 Jan. 8, 2015

(30) Foreign Application Priority Data

Jul. 5, 2013 (JP) ................... 2013-141605

(51) Int. Cl.
*F01N 3/00* (2006.01)
*F01N 11/00* (2006.01)
*F01N 3/20* (2006.01)
*F01N 3/28* (2006.01)

(52) U.S. Cl.
CPC ............. *F01N 11/00* (2013.01); *F01N 3/2026* (2013.01); *F01N 3/2853* (2013.01); *F01N 2550/02* (2013.01); *F01N 2900/0422* (2013.01)

(58) Field of Classification Search
USPC .................................................. 60/272–324
See application file for complete search history.

(56) References Cited

U.S. PATENT DOCUMENTS

| 5,758,492 | A | 6/1998 | Kato et al. | |
|---|---|---|---|---|
| 2012/0131907 | A1* | 5/2012 | Yoshioka et al. | 60/276 |
| 2012/0260638 | A1* | 10/2012 | Yoshioka et al. | 60/295 |
| 2013/0025267 | A1* | 1/2013 | Yoshioka et al. | 60/300 |
| 2013/0200060 | A1* | 8/2013 | Yoshioka et al. | 219/201 |
| 2013/0306623 | A1* | 11/2013 | Kumagai et al. | 219/534 |
| 2014/0292350 | A1* | 10/2014 | Yoshioka | 324/551 |

FOREIGN PATENT DOCUMENTS

| JP | A-9-21309 | 1/1997 | |
|---|---|---|---|
| JP | A-2010-223159 | 10/2010 | |
| JP | A-2012-72665 | 4/2012 | |
| WO | WO 2010/109304 A1 | 9/2010 | |
| WO | 2013/094021 A1 | 6/2013 | |
| WO | WO 2013094021 A1 * | 6/2013 | ............. F01N 11/00 |

* cited by examiner

*Primary Examiner* — Jesse Bogue
(74) *Attorney, Agent, or Firm* — Oliff PLC

(57) ABSTRACT

A control system includes an electrical heating catalyzer, a measuring device and an electronic control unit. The measuring device measures an insulation resistance between a catalyst carrier and case of the electrical heating catalyzer. The electronic control unit determines that the electrical heating catalyzer has a failure when a variation width of the insulation resistance is smaller than or equal to a set value in a historical variation in the insulation resistance measured by the measuring device.

8 Claims, 7 Drawing Sheets

CONTROL SYSTEM AND CONTROL METHOD FOR ELECTRICAL HEATING CATALYZER

INCORPORATION BY REFERENCE

The disclosure of Japanese Patent Application No. 2013-141605 filed on Jul. 5, 2013 including the specification, drawings and abstract is incorporated herein by reference in its entirety.

BACKGROUND OF THE INVENTION

1. Field of the Invention

The invention relates to a control system and control method for an electrical heating catalyzer.

2. Description of Related Art

There is known an electrical heating catalyzer (EHC) as an exhaust emission control device for an internal combustion engine. A known electrical heating catalyzer, for example, includes a catalyst carrier electrically connected to electrodes, a case that accommodates the catalyst carrier and an electrical insulating mat interposed between the catalyst carrier and the case.

In the thus configured electrical heating catalyzer, if an insulation resistance between the catalyst carrier and the case reduces, electricity may flow through the case at the time when the catalyst carrier is energized. Thus, when the insulation resistance of the electrical heating catalyzer has reduced, energization of the electrical heating catalyzer needs to be prohibited.

The insulation resistance between the catalyst carrier and the case reduces not only when the electrical heating catalyzer has a failure but also when condensed water is present between the catalyst carrier and the case or when carbon has adhered to or accumulated on the mat.

Therefore, there has been suggested a technique for, when the insulation resistance between the catalyst carrier and the case has reduced, initially executing the process of removing condensed water or carbon by raising the temperature of the electrical heating catalyzer and then prohibiting energization by determining that the electrical heating catalyzer has a failure when the insulation resistance is small after the process (for example, see Japanese Patent Application Publication No. 2012-072665 (JP 2012-072665 A)).

Incidentally, when condensed water or carbon is removed from the electrical heating catalyzer, energization of the electrical heating catalyzer or raising the exhaust gas temperature is required, so the fuel consumption of an internal combustion engine increases. Particularly, when carbon is removed, it is required to significantly raise the temperature of the electrical heating catalyzer as compared to that when condensed water is removed, so the fuel consumption of the internal combustion engine may further increase.

SUMMARY OF THE INVENTION

In the above-described existing technique, a factor causing a reduction in the insulation resistance is not identified when there occurs a reduction in the insulation resistance. Therefore, when there occurs a reduction in the insulation resistance due to a failure as well, the temperature of the electrical heating catalyzer needs to be raised. Thus, there is a possibility that the fuel consumption of the internal combustion engine unnecessarily increases.

The invention is contemplated in view of the above-described situation, and provides a technique for making it possible to detect a failure of an electrical heating catalyzer without raising the temperature of the electrical heating catalyzer.

The invention determines whether the electrical heating catalyzer has a failure on the basis of a historical variation in an insulation resistance.

More specifically, a control system includes an electrical heating catalyzer, a measuring device and an electronic control unit. The electrical heating catalyzer is arranged in an exhaust passage of an internal combustion engine, and includes a catalyst carrier, a case and an electrical insulating member. The catalyst carrier is configured to generate heat through energization. The case is configured to accommodate the catalyst carrier. The electrical insulating member is arranged between the catalyst carrier and the case. The measuring device is configured to measure an insulation resistance between the catalyst carrier and the case. The electronic control unit is configured to determine whether the electrical heating catalyzer has a failure on the basis of a historical variation in the insulation resistance measured by the measuring device.

In a control method for an electrical heating catalyzer, the electrical heating catalyzer is arranged in an exhaust passage of an internal combustion engine, and includes a catalyst carrier, a case and an electrical insulating member. The catalyst carrier generates heat through energization. The case accommodates the catalyst carrier. The electrical insulating member is arranged between the catalyst carrier and the case. The control method includes: measuring an insulation resistance between the catalyst carrier and the case with the use of a measuring device; and determining, by an electronic control unit, whether the electrical heating catalyzer has a failure on the basis of a historical variation in the insulation resistance.

According to the invention, when the insulation resistance of the electrical heating catalyzer reduces, it is possible to detect a failure of the electrical heating catalyzer without raising the temperature of the electrical heating catalyzer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
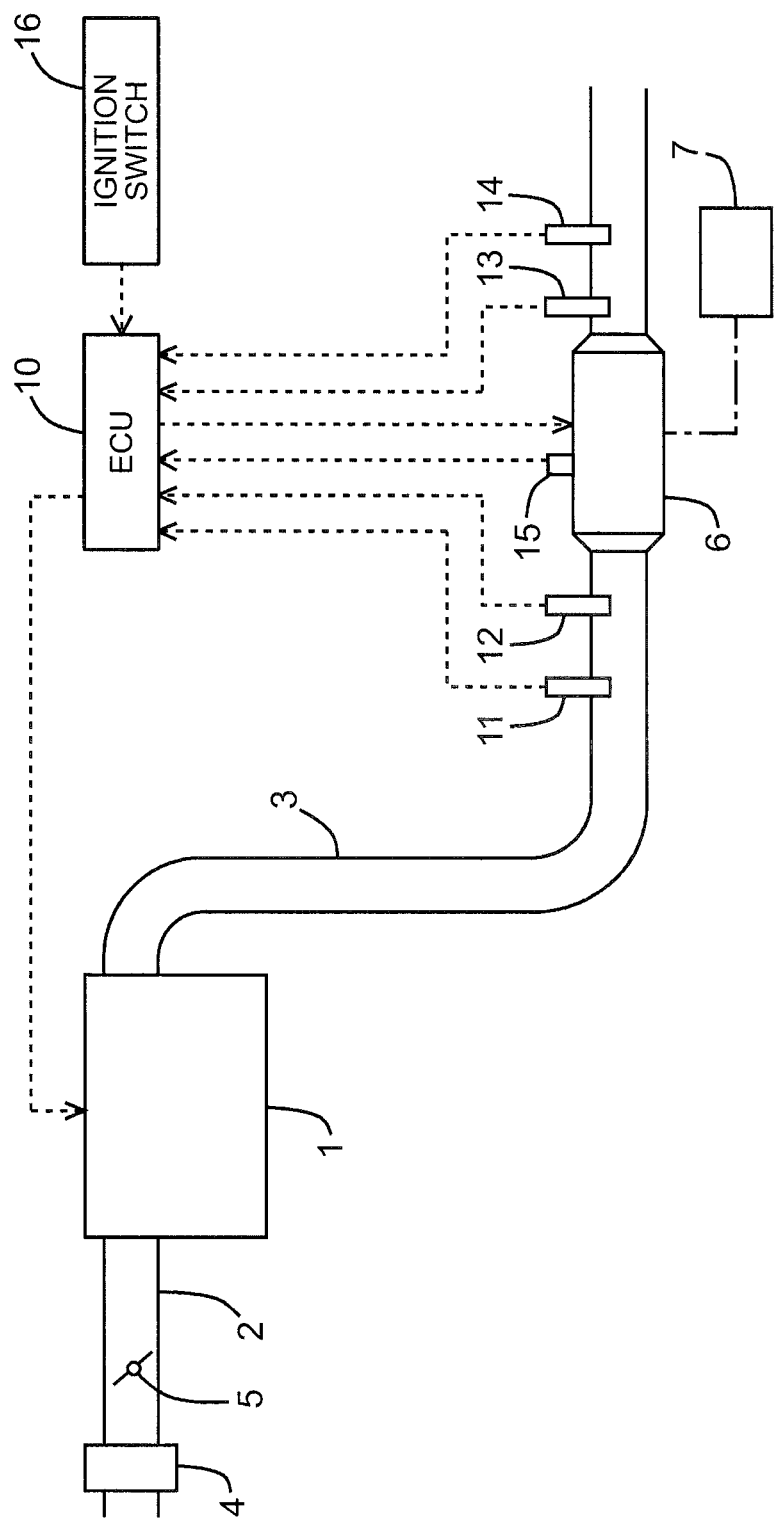
FIG. 1 is a view that shows the schematic configuration of an internal combustion engine and its exhaust system, to which the invention is applied.

Changes in insulation resistance during operation of an internal combustion engine vary between the case where the insulation resistance is reduced because of the influence of condensed water or carbon present between a catalyst carrier and a case and the case where the insulation resistance is reduced because of a failure of an electrical heating catalyzer. For example, when the insulation resistance reduces because of the influence of condensed water or carbon present between the catalyst carrier and the case, the insulation resistance reduces in a period from when the internal combustion engine is started to when the temperature of the electrical heating catalyzer rises to a certain degree. In contrast, when the insulation resistance is reduced because of a failure of the electrical heating catalyzer, the insulation resistance is substantially constant irrespective of an operating state of the internal combustion engine, the temperature of the electrical heating catalyzer, or the like.

In view of the above-described characteristics, it is possible to determine whether the electrical heating catalyzer has a failure on the basis of a historical variation in the insulation resistance measured by a measuring device. With such a method, it is possible to determine whether the electrical heating catalyzer has a failure without raising the temperature of the electrical heating catalyzer. As a result, it is possible to detect a failure of the electrical heating catalyzer without leading to an increase in fuel consumption resulting from a rise in the temperature of the electrical heating catalyzer.

Here, it may be determined whether the electrical heating catalyzer has a failure on the basis of the historical variation in the insulation resistance continuously measured by the measuring device in a period from when an ignition switch 16 is turned on and an internal combustion engine 1 is started to when the ignition switch 16 is turned off. However, because energization of the electrical heating catalyzer is required when the insulation resistance is measured, if the insulation resistance is continuously measured by the measuring device in the period from when the ignition switch is turned on and the internal combustion engine is started to when the ignition switch is turned off, it may lead to an increase in the fuel consumption resulting from an increase in electric power consumption. When the insulation resistance is measured, a voltage lower than that in the case where a catalyst carrier 61 is heated is applied to the electrical heating catalyzer.

Therefore, an electronic control unit may determine that the electrical heating catalyzer has a failure when a variation width of the insulation resistance measured by the measuring device in a predetermined period is smaller than or equal to a set value. The "predetermined period" is a period that at least includes a period in which a variation in the insulation resistance due to the influence of condensed water or carbon appears unless the electrical heating catalyzer has a failure. The predetermined period may be a period including a period from when the ignition switch 16 is turned on to when a warm-up of the electrical heating catalyzer completes.

In a period from when the internal combustion engine 1 is started to when a warm-up of the electrical heating catalyzer completes, condensed water present in an exhaust passage, or the like, at a portion upstream of the electrical heating catalyzer flows into the electrical heating catalyzer together with exhaust gas, so the insulation resistance exhibits a reducing tendency. In the period from when the internal combustion engine 1 is started to when a warm-up of the electrical heating catalyzer completes, the amount of unburned fuel components contained in exhaust gas increases, so the amount of carbon that adheres to or accumulates on an electrical insulating member also increases. As a result, the insulation resistance exhibits a reducing tendency. Thus, when the predetermined period is set so as to include the period from when the internal combustion engine 1 is started to when a warm-up of the electrical heating catalyzer completes, it is possible to determine whether the electrical heating catalyzer has a failure while reducing an increase in the fuel consumption resulting from measurement of the insulation resistance.

The measuring device may intermittently measure the insulation resistance in the predetermined period. In this case, the electronic control unit may determine that the electrical heating catalyzer has a failure when a difference between a plurality of the insulation resistances measured by the measuring device is smaller than or equal to a set value. With this configuration, it is possible to determine whether the electrical heating catalyzer has a failure while further reducing an increase in the fuel consumption resulting from measurement of the insulation resistance.

In the case where the electrical heating catalyzer has no failure, when condensed water or carbon adheres to the electrical insulating member between the catalyst carrier and the case, the insulation resistance reduces. In such a case, it is required to remove condensed water or carbon. In contrast, it is conceivable to employ a method of raising the temperature of the electrical heating catalyzer to a temperature range in which condensed water and carbon are removed. Incidentally, a temperature range in which condensed water is removed, that is, vaporized, is lower than a temperature range in which carbon is removed, that is, oxidized. Therefore, in the case where the insulation resistance is reduced because of the influence of condensed water, when the temperature of the electrical heating catalyzer is raised to the temperature range in which carbon can also be removed, the fuel consumption resulting from a rise in temperature unnecessarily increases.

In contrast, the electronic control unit may raise the temperature of the electrical heating catalyzer to a temperature range based on a factor causing a reduction in the insulation resistance. For example, the electronic control unit executes a first process when the insulation resistance measured by the measuring device reduces after the internal combustion engine 1 is started and then increases to an appropriate value. The first process is a process of removing condensed water from the electrical heating catalyzer. The electronic control unit executes a second process when the insulation resistance measured by the measuring device reduces after the internal combustion engine 1 is started and then does not increase to the appropriate value. The second process is a process of removing carbon from the electrical heating catalyzer.

When the temperature of an atmosphere in the exhaust passage becomes low during an operation stop of the internal combustion engine 1, moisture present in the exhaust passage condensates and forms condensed water. When condensed water is formed in the exhaust passage at a portion upstream of the electrical heating catalyzer, the condensed water flows toward the downstream side of the exhaust passage upon reception of the pressure of exhaust gas after the internal combustion engine 1 is started, and flows into the case of the electrical heating catalyzer. When condensed water flowing into the case adheres to the end face of the electrical insulating member or penetrates into the electrical insulating member, the insulation resistance between the catalyst carrier and the case reduces. Condensed water that has entered the case of the electrical heating catalyzer vaporizes with a rise in exhaust gas temperature and a rise in the temperature of the electrical heating catalyzer. Gas produced through vaporization of condensed water is emitted from the case together with exhaust gas. As a result, the insulation resistance increases with a rise in the temperature of the electrical heating catalyzer. When most of condensed water in the case is removed, the insulation resistance returns to an appropriate value.

After the internal combustion engine 1 is started, when a catalyst warm-up process that accompanies an increase in unburned fuel components contained in exhaust gas, such as retardation of ignition timing, is executed, carbon contained in exhaust gas increases. Furthermore, when warm-up operation of the internal combustion engine 1 that accompanies, for example, an increase in fuel injection amount, is continued even after the end of the catalyst warm-up process, carbon contained in exhaust gas increases. Carbon contained in exhaust gas adheres to or accumulates on the upstream-side end face of the electrical insulating member. When carbon adheres to or accumulates on the upstream-side end face of the electrical insulating member, the insulation resistance between the catalyst carrier and the case reduces. After completion of a warm-up of the internal combustion engine 1, part of carbon adhered to or accumulated on the upstream-side end face, or the like, of the electrical insulating member may be oxidized or removed; however, most of carbon remains. As a result, the insulation resistance is hard to increase to an appropriate value.

In view of the above phenomenon, when the insulation resistance measured by the measuring device reduces after the internal combustion engine 1 is started and then increases to an appropriate value, it may be estimated that the insulation resistance is reduced because of the influence of condensed water. As a result, when the first process is executed in the case where the insulation resistance measured by the measuring device reduces after the internal combustion engine 1 is started and then increases to an appropriate value, it is possible to eliminate a reduction in the insulation resistance due to the influence of condensed water.

When the insulation resistance measured by the measuring device reduces after the internal combustion engine 1 is started and then does not increase to an appropriate value, it may be estimated that the insulation resistance is reduced because of the influence of carbon. As a result, when the second process is executed in the case where the insulation resistance measured by the measuring device reduces after the internal combustion engine 1 is started and then does not increase to an appropriate value, it is possible to eliminate a reduction in the insulation resistance due to the influence of carbon.

Here, in a period from when the ignition switch 16 is turned on to the timing at which it is estimated that most of condensed water in the electrical heating catalyzer is removed, when the measuring device continuously measures the insulation resistance, it may lead to an increase in the fuel consumption resulting from measurement of the insulation resistance. Therefore, the measuring device may intermittently measure the insulation resistance in the above period, and the electronic control unit may execute the first process or the second process by comparing a plurality of the insulation resistances measured by the measuring device.

Specifically, the measuring device may measure the insulation resistance at the following first timing to fifth timing. The first timing is timing at which the ignition switch 16 is turned on. The second timing is timing at which the catalyst warm-up process after the internal combustion engine 1 is started is ended. The third timing is timing at which a warm-up of the electrical heating catalyzer completes. The fourth timing is timing at which a warm-up of the internal combustion engine 1 completes. The fifth timing is timing at which a predetermined time has elapsed from the completion of warm-up of the internal combustion engine 1. The "predetermined time" is a time required to remove condensed water present in the electrical heating catalyzer. The fifth timing may be determined by setting any one of the first timing to the third timing as a starting point. That is, the fifth timing may be timing at which a time in which condensed water in the electrical heating catalyzer can be removed has elapsed after any one of the first timing to the third timing.

In the case where the above-described measuring method is used, the electronic control unit may execute the first process when the insulation resistance at the second timing is smaller than the insulation resistance at the first timing, the insulation resistance at the fourth timing or fifth timing is larger than the insulation resistance at the third timing and a difference between the insulation resistance at the fifth timing and the insulation resistance at the first timing is smaller than a predetermined value. The "predetermined value" is a value obtained by adding a margin to a tolerance of a measured value due to a difference in measuring environment between the first timing and the fifth timing. The measuring environment is, for example, a temperature environment, or the like. The electronic control unit may execute the second process when the insulation resistance at the second timing is smaller than the insulation resistance at the first timing, the insulation resistance at the third timing is smaller than the insulation resistance at the second timing and the insulation resistance at the fifth timing is smaller than the insulation resistance at the first timing. Preferably, the second process may be executed when the insulation resistance at the fifth timing is smaller by the predetermined value or more than the insulation resistance at the first timing.

With the above configuration, it is possible to execute the process suitable for the factor causing a reduction in the insulation resistance while reducing an increase in the fuel consumption resulting from measurement of the insulation resistance. As a result, it is also possible to minimize an increase in the fuel consumption resulting from removal of condensed water or carbon.

So-called short trip operation may be executed. In the short trip operation, operation of the internal combustion engine 1 is stopped before the insulation resistance at the third timing, the fourth timing or the fifth timing is measured. If short trip operation is repeated, it is not possible to distinguish a reduction in the insulation resistance due to the influence of condensed water and a reduction in the insulation resistance due to the influence of carbon from each other, and it may not be possible to execute the first process or the second process.

Therefore, the electronic control unit may count the number of times the internal combustion engine 1 is stopped before the insulation resistance at any one of the third timing, the fourth timing and the fifth timing is measured. In this case, the electronic control unit may execute the second process when the number of times counted is larger than or equal to a set number of times and the insulation resistance at the first timing is smaller than a first threshold. The electronic control unit may execute the first process when the number of times counted is larger than or equal to the set number of times and the insulation resistance at the first timing is smaller than a second threshold larger than the first threshold.

The first threshold corresponds to a minimum value that can be taken by the insulation resistance at the first timing when no carbon accumulates between the catalyst carrier and the case and condensed water accumulates between the catalyst carrier and the case. The second threshold corresponds to a value obtained by adding a margin to a maximum value that can be taken by the insulation resistance at the first timing when no carbon accumulates between the catalyst carrier and the case and condensed water accumulates between the catalyst carrier and the case.

With such a configuration, even when operation in which the internal combustion engine is stopped before the insulation resistance at any one of the third timing to the fifth timing is measured (short trip operation) is repeated, it is possible to execute the process based on the factor causing a reduction in the insulation resistance.

Hereinafter, an example embodiment of the invention will be described with reference to the accompanying drawings. The size, material, relative arrangement, and the like, of components described in the present embodiment do not intend to limit the technical scope of the invention unless otherwise specified.

Initially, a first embodiment of a control system for an electrical heating catalyzer according to the invention will be described with reference to FIG. 1 to FIG. 6.

FIG. 1 is a view that shows the schematic configuration of the internal combustion engine and its intake and exhaust systems, to which the invention is applied. The internal combustion engine 1 shown in FIG. 1 is mounted on a vehicle as a driving source. The driving source of the vehicle is not limited to the internal combustion engine 1, and may be a driving source that uses an electric motor and the internal combustion engine 1 in combination.

The internal combustion engine 1 is a compression-ignition internal combustion engine (diesel engine) or a spark-ignition internal combustion engine (gasoline engine). An intake pipe 2 and an exhaust pipe 3 are connected to the internal combustion engine 1.

An air flow meter 4 and an intake throttle valve 5 are arranged in the middle of the intake pipe 2. The air flow meter 4 is a sensor that outputs an electrical signal that correlates with the amount of fresh air (air) flowing in the intake pipe 2. The intake throttle valve 5 is a valve mechanism that changes the intake air amount of the internal combustion engine 1 by changing the passage sectional area in the intake pipe 2.

An electrical heating exhaust emission control device (EHC) 6 is arranged in the middle of the exhaust pipe 3. The EHC 6 is an exhaust emission control device including a heating element that generates heat at the time when electric power from a battery 7 is applied. The detailed configuration of the EHC 6 will be described later.

An air-fuel ratio sensor 11 and an upstream-side temperature sensor 12 are provided in the exhaust pipe 3 at a portion upstream of the EHC 6. An oxygen concentration sensor ($O_2$ sensor) 13 and a downstream-side temperature sensor 14 are provided in the exhaust pipe 3 at a portion downstream of the EHC 6. The air-fuel ratio sensor 11 is a sensor that outputs an electrical signal that correlates with the air-fuel ratio of exhaust gas flowing in the exhaust pipe 3. The upstream-side temperature sensor 12 and the downstream-side temperature sensor 14 each are a sensor that outputs an electrical signal that correlates with the temperature of exhaust gas flowing in the exhaust pipe 3. The oxygen concentration sensor 13 is a sensor that outputs an electrical signal that correlates with the oxygen concentration of exhaust gas flowing in the exhaust pipe 3. A detector 15 for detecting, that is, measuring, the insulation resistance of the EHC 6 (hereinafter, referred to as detector) is attached to the EHC 6. The detector 15 is an example of the measuring device.

An electronic control unit (ECU) 10 for controlling the internal combustion engine 1 is provided together with the internal combustion engine 1. The ECU 10 is electrically connected to the ignition switch 16 in addition to the above-described various sensors, such as the air flow meter 4, the air-fuel ratio sensor 11, the upstream-side temperature sensor 12, the oxygen concentration sensor 13, the downstream-side temperature sensor 14 and the detector 15. Furthermore, the ECU 10 is electrically connected to various devices, such as the intake throttle valve 5, the EHC 6 and a fuel injection valve (not shown). The EHC 6 controls the above-described various devices on the basis of the output signals from the above-described various sensors.

Figure 2:
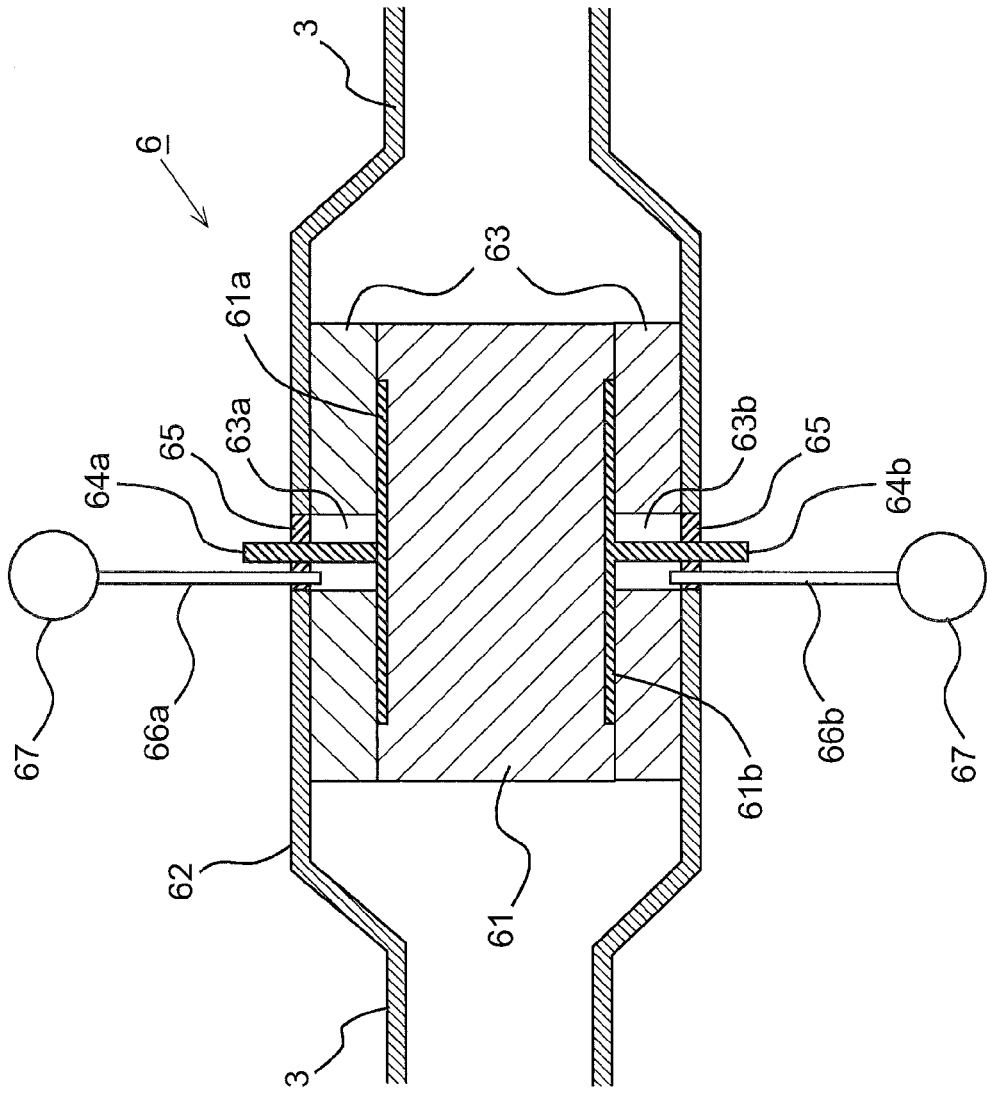
FIG. 2 is a view that shows the schematic configuration of an EHC.

Next, the configuration of the EHC 6 according to the present embodiment will be described with reference to FIG. 2. FIG. 2 is a longitudinal cross-sectional view showing the schematic configuration of the EHC 6. The EHC 6 includes the catalyst carrier 61, a case 62 and a mat 63. These catalyst carrier 61, case 62 and mat 63 are coaxially arranged.

The catalyst carrier 61 is a honeycomb structure formed in a cylindrical columnar shape. The honeycomb structure is formed of porous ceramics (for example, SiC). A catalyst, such as an oxidation catalyst, a three-way catalyst, a $NO_X$ storage reduction catalyst and a $NO_X$ selective reduction catalyst, is supported on the catalyst carrier 61. A pair of electrodes 61a, 61b are provided on the outer periphery of the catalyst carrier 61. Those electrodes 61a, 61b are arranged at mutually facing positions on the outer periphery of the catalyst carrier 61.

The case 62 is a metal (for example, stainless steel) cabinet that accommodates the catalyst carrier 61, and is formed in a cylindrical shape having an inside diameter larger than the outside diameter of the catalyst carrier 61. The upstream-side end portion and downstream-side end portion of the case 62 are tapered so as to reduce in diameter as distanced from the catalyst carrier 61.

The mat 63 is an annular member that is press-fitted between the outer periphery of the catalyst carrier 61 and the inner periphery of the case 62. The mat 63 is formed of a material having a low electrical conductivity (for example, an inorganic fiber, such as alumina fiber). The mat 63 supports (holds) the catalyst carrier 61 while suppressing a short circuit between the case 62 and the catalyst carrier 61 (electrodes 61a, 61b). The mat 63 is one embodiment of an electrical insulating member according to the invention. The electrical insulating member is not limited to the mat 63, and may be the one that has a low electrical conductivity and that serves as a shock-absorbing material.

Through-holes 63a, 63b are formed in the mat 63 at portions facing the electrodes 61a, 61b. The through-holes 63a, 63b respectively extend from the electrodes 61a, 61b to the case 62. Electrode terminals 64a, 64b for supplying electric power to the electrodes 61a, 61b are respectively accommodated in these through-holes 63a, 63b. The proximal ends of the electrode terminals 64a, 64b are respectively connected to the electrodes 61a, 61b. The terminal ends of the electrode terminals 64a, 64b extend through the case 62 and protrude outward of the case 62.

At the portions at which the electrode terminals 64a, 64b extend through the case 62, support members 65 are respectively interposed between the electrode terminal 64a and the case 62 and between the electrode terminal 64b and the case 62. The support members 65 each are formed of an electrical insulating element having a low electrical conductivity, thus preventing a short circuit between the electrode terminals 64a, 64b and the case 62. The support members 65 and the electrode terminals 64a, 64b are airtightly bonded, and the support members 65 and the case 62 are also airtightly bonded.

In the thus configured EHC 6, when voltage is applied from the battery 7 between the electrodes 61a, 61b, the catalyst carrier 61 serves as a resistive element and generates heat. As a result, the temperature (bed temperature) of the catalyst rises. For example, when battery voltage is applied between the electrodes 61a, 61b in the case where the internal combustion engine 1 is cold-started, it is possible to early activate the catalyst supported on the catalyst carrier 61. When battery voltage is applied between the electrodes 61a, 61b in a state where the internal combustion engine 1 decelerates and is in a fuel-cut operation state, it is also possible to suppress a decrease in the temperature of the catalyst supported on the catalyst carrier 61.

Incidentally, when the insulation resistance between the catalyst carrier 61 (or the electrodes 61a, 61b) and the case 62 reduces in the EHC 6, there is a concern that electricity may leak from the catalyst carrier 61 or the electrodes 61a, 61b to the case 62 when the EHC 6 is energized. Therefore, it is required to measure the insulation resistance between the catalyst carrier 61 and the case 62 with the use of the detector 15, and to prohibit energization of the EHC 6 when the measured value is smaller than a regulated value. The regulated value is, for example, set to 1 MΩ.

However, although the insulation resistance reduces because of an unrecoverable factor like the case where the EHC 6 has a failure, the insulation resistance can reduce because of a recoverable factor like the case where condensed water is present in the mat 63 or the through-holes 63a, 63b or when carbon has adhered to or accumulated on the mat 63 or the through-holes 63a, 63b. For example, when the insulation resistance reduces because of condensed water or carbon, it is possible to recover the insulation resistance by raising the temperature of the EHC 6 to the temperature range in which condensed water and carbon are removed. Thus, when the insulation resistance reduces, the temperature of the EHC 6 is raised to the temperature range in which condensed water and carbon are removed, and it may be determined that the EHC 6 has a failure when the insulation resistance does not recover to an appropriate value thereafter.

Incidentally, with the above-described method, when it is determined whether the EHC 6 has a failure, it is required to raise the temperature of the EHC 6 to the temperature range in which condensed water and carbon are removed, so it may lead to an unnecessary increase in the fuel consumption.

Therefore, in the present embodiment, when the insulation resistance is reduced, it is determined whether the EHC 6 has a failure on the basis of the historical variation in the insulation resistance. Hereinafter, a method of determining whether the EHC 6 has a failure according to the present embodiment will be described.

Changes (historical variation) in the insulation resistance in a period from when the ignition switch 16 is turned on and the internal combustion engine 1 is started to when the ignition switch 16 is turned off vary among the case where condensed water is present between the catalyst carrier 61 and the case 62, the case where carbon is present between the catalyst carrier 61 and the case 62 and the case where the EHC 6 has a failure. Thus, it is possible to determine whether the factor causing a reduction in the insulation resistance is a failure of the EHC 6 on the basis of the historical variation in the insulation resistance measured in the period.

When the temperature of the atmosphere in the exhaust pipe 3 is low during an operation stop of the internal combustion engine 1, moisture present in the exhaust pipe 3 condensates and forms condensed water. Condensed water flows toward the downstream side in the exhaust pipe 3 upon reception of the pressure of exhaust gas after the internal combustion engine 1 is started, and flows into the case 62 of the EHC 6. When condensed water flowing into the case 62 adheres to the end face of the mat 63 or penetrates into the mat 63, the insulation resistance between the catalyst carrier 61 and the case 62 reduces. Condensed water that has entered the case 62 vaporizes with a rise in the exhaust gas temperature and a rise in the temperature of the catalyst carrier 61. Gas produced through vaporization of condensed water is emitted from the case together with exhaust gas.

Figure 3:
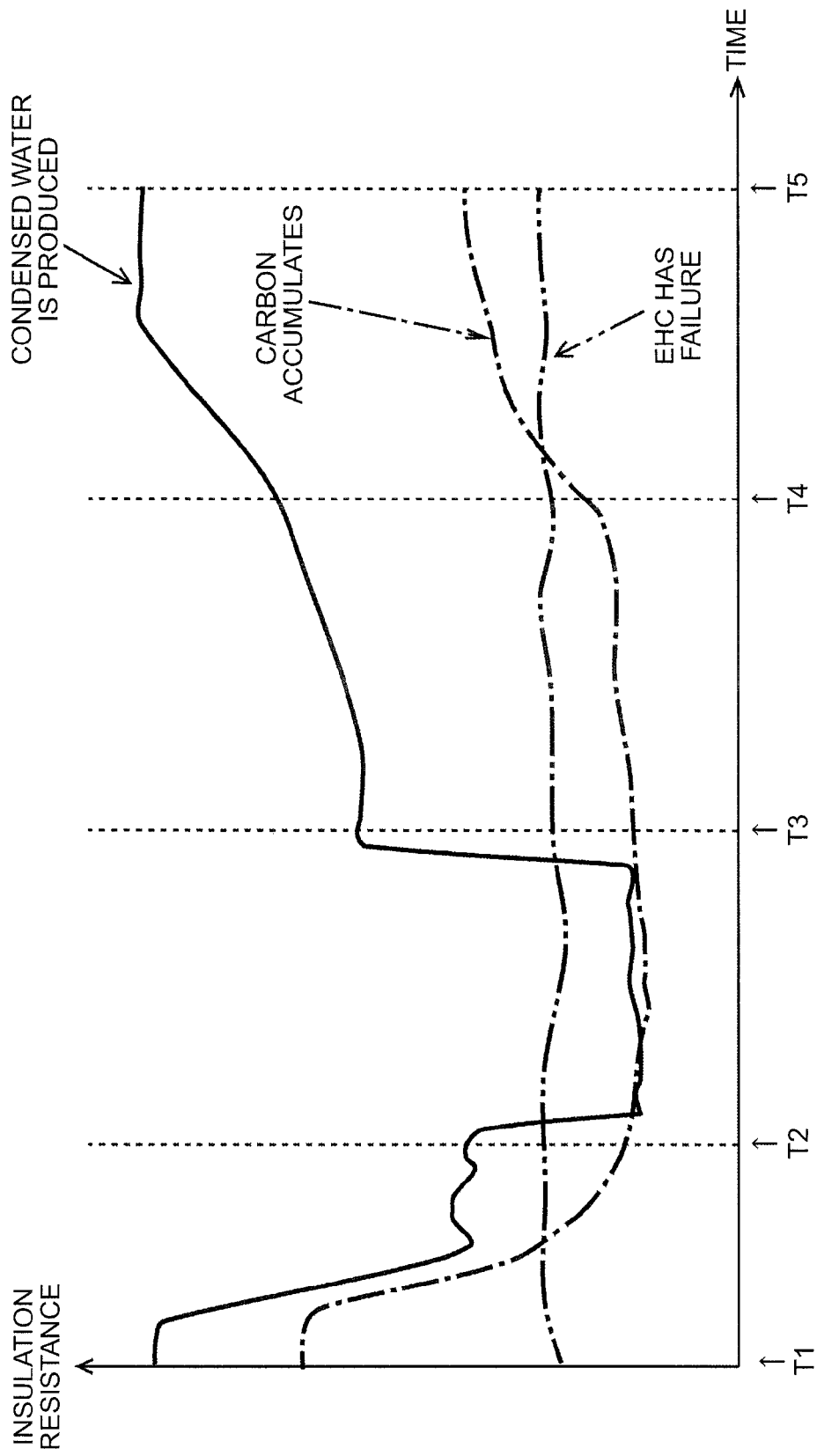
FIG. 3 is a graph that shows a temporal variation in insulation resistance in a period from when an ignition switch is turned on to when the ignition switch is turned off.

In view of the above phenomenon, when the insulation resistance reduces because of the influence of condensed water, the insulation resistance is relatively large at the time when the ignition switch 16 is turned on (first timing T1) before the internal combustion engine 1 is started as indicated by the continuous line in FIG. 3. Subsequently, until the catalyst warm-up process completes (second timing T2) after the internal combustion engine 1 is started, the insulation resistance reduces over time because of entry of condensed water into the case 62 of the EHC 6. After that, through completion of warm-up of the EHC 6, in other words, activation of the EHC 6 (third timing T3) and completion of warm-up of the internal combustion engine 1 (fourth timing T4), the insulation resistance increases over time. At the time when condensed water in the EHC 6 is removed (fifth timing T5), the insulation resistance is substantially equal to the insulation resistance at the first timing T1. In short, when the insulation resistance reduces because of the influence of condensed water, the insulation resistance once reduces after the internal combustion engine is started and then increases to an appropriate value.

When the internal combustion engine 1 is cold-started, the amount of carbon contained in exhaust gas is larger than that when the internal combustion engine 1 is hot-started. When the catalyst warm-up process that accompanies an increase in unburned fuel components contained in exhaust gas, such as retardation of ignition timing, is executed after the internal combustion engine 1 is cold-started, carbon contained in exhaust gas increases. In addition, when warm-up operation of the internal combustion engine 1 that accompanies, for example, an increase in fuel injection amount, is continued even after the end of the catalyst warm-up process, carbon contained exhaust gas increases.

Carbon contained in exhaust gas adheres to or accumulates on the upstream-side end face, or the like, of the mat 63. When carbon adheres to or accumulates on the upstream-side end face, or the like, of the mat 63, the insulation resistance between the catalyst carrier 61 and the case 62 reduces. After completion of warm-up of the internal combustion engine 1, part of carbon that has adhered to or accumulated on the upstream-side end face, or the like, of the mat 63 can be oxidized or removed; however, most of carbon remains.

In view of the above phenomenon, when the insulation resistance reduces because of the influence of carbon, carbon in exhaust gas adheres to and accumulates on the upstream-side end face of the mat 63 in the period from when the ignition switch 16 is turned on (T1) before the internal combustion engine 1 is started to when a warm-up of the internal combustion engine 1 completes (T4) as indicated by the alternate long and short dashed line in FIG. 3, so the insulation resistance reduces over time. After completion of warm-up of the internal combustion engine 1 (after T4), part of carbon that adheres to the mat 63 may be oxidized and removed; however, most of carbon remains. In short, when the insulation resistance reduces because of the influence of carbon, the insulation resistance reduces after the internal combustion engine 1 is started, and then does not increase to an appropriate value.

When the insulation resistance reduces because of a failure of the EHC 6 caused by a broken wire, or the like, the insulation resistance becomes substantially constant in the period from when the ignition switch 16 is turned on and the internal combustion engine 1 is started to when the ignition switch 16 is turned off as indicated by the alternate long and two-short dashed line in FIG. 3.

In view of changes in the insulation resistance as described above, it is possible to determine whether the EHC 6 has a failure on the basis of the historical variation in the insulation resistance in the period from T1 to T5. For example, when the variation width of the insulation resistance is smaller than or equal to a set value in the period from T1 to T5, it may be determined that the EHC 6 has a failure. Thus, it is possible to determine whether the EHC 6 has a failure without raising the temperature of the EHC 6 to the temperature range in which condensed water or carbon is removed. As a result, it is possible to determine whether the EHC 6 has a failure while suppressing an increase in the fuel consumption resulting from a rise in the temperature of the EHC 6.

When the detector 15 measures the insulation resistance, energization of the EHC 6 is required. In energization of the EHC 6, a voltage lower than that in the case where the catalyst carrier 61 is caused to generate heat is applied. Therefore, when the detector 15 continuously measures the insulation resistance in the period from T1 to T5, it may lead to an increase in the fuel consumption resulting from an increase in the electric power consumption.

Therefore, in the present embodiment, the detector 15 may detect the insulation resistance in a predetermined period shorter than the period from T1 to T5. The "predetermined period" is a period in which a variation in the insulation resistance due to the influence of condensed water or carbon appears unless the EHC 6 has a failure, and is, for example, a period from T1 to T3. In this case, it is possible to reduce an increase in the fuel consumption resulting from measurement of the insulation resistance with the use of the detector 15.

In the present embodiment, the detector 15 may intermittently measure the insulation resistance in the period from T1 to T5. For example, the detector 15 may measure the insulation resistance at three timings of T1, T2, T3. The detector 15 may measure the insulation resistance at three timings of T1, T4, T5. In this way, when the detector 15 intermittently measures the insulation resistance, the ECU 10 may determine that the EHC 6 has a failure when a difference between a plurality of the insulation resistances measured by the detector 15 is smaller than or equal to a set value. With such a method, it is possible to determine whether the EHC 6 has a failure while further reducing an increase in the fuel consumption resulting from measurement of the insulation resistance.

When the EHC 6 has no failure in the case where the insulation resistance is reduced, it may be understood that the insulation resistance is reduced because of the influence of condensed water or carbon. Therefore, when the EHC 6 has no failure in the case where the insulation resistance is reduced, the ECU 10 may raise the temperature of the EHC 6 to the temperature range in which condensed water and carbon are removed. However, the temperature range in which carbon is removed, that is, oxidized, is higher than the temperature range in which condensed water is removed, that is, vaporized. Therefore, when the temperature of the EHC 6 is raised to the temperature range in which carbon can be removed in the case where the insulation resistance is reduced because of the influence of condensed water, an increase in the fuel consumption resulting from a temperature rise becomes large. Thus, when the EHC 6 has no failure, it is desirable to identify whether a reduction in the insulation resistance is due to condensed water or carbon and then to execute the process based on the identified result.

As described above, when the insulation resistance reduces because of the influence of condensed water, the insulation resistance once reduces after the internal combustion engine is started and then increases to an appropriate value. On the other hand, when the insulation resistance reduces because of the influence of carbon, the insulation resistance reduces after the internal combustion engine 1 is started, and then does not increase to an appropriate value. Thus, when the insulation resistance once reduces and then increases to an appropriate value in the period from T1 to T5, it may be determined that the insulation resistance is reduced because of the influence of condensed water. On the other hand, when the insulation resistance reduces but does not increase to an appropriate value thereafter in the period from T1 to T5, it may be determined that the insulation resistance is reduced because of the influence of carbon.

Thus, it is possible to determine whether the factor causing a reduction in the insulation resistance is condensed water or carbon on the basis of the historical variation in the insulation resistance in the period from T1 to T5. However, when the detector 15 continuously measures the insulation resistance in the period from T1 to T5, the fuel consumption may increase.

Therefore, in the present embodiment, the detector 15 measures the insulation resistance at five timings of T1 to T5. In this case, the ECU 10 may determine that the insulation resistance is reduced because of the influence of condensed water when the insulation resistance at T2 is smaller than the insulation resistance at T1, the insulation resistance at T4 or T5 is larger than the insulation resistance at T3 and the insulation resistance at T5 is equivalent to the insulation resistance at T1. This determination condition is referred to as "first condition". If a temperature environment, or the like, varies between T1 and T5, the insulation resistances of both may not be equal to each other. Therefore, when a difference between the insulation resistance at T1 and the insulation resistance at T5 is smaller than or equal to a predetermined value, it may be determined that the insulation resistances of both are equivalent to each other. The "predetermined value" is a maximum variation amount of the insulation resistance due to a difference in temperature environment or a value obtained by adding a margin to the maximum variation amount.

The ECU 10 just needs to determine that the insulation resistance is reduced because of the influence of carbon when the insulation resistance at T2 is smaller than the insulation resistance at T1, the insulation resistance at T3 is smaller than the insulation resistance at T2 and the insulation resistance at T5 is smaller by a predetermined value or more than the insulation resistance at T1. This determination condition is referred to as "second condition".

When the factor causing a reduction in the insulation resistance is determined with the above-described method, the ECU 10 just needs to executes the process based on the factor causing a reduction in the insulation resistance. For example, when the insulation resistance is reduced because of the influence of condensed water, the ECU 10 just needs to execute the process of raising the temperature of the EHC 6 to the temperature range in which condensed water vaporizes. This process is termed "first process". When the insulation resistance is reduced because of the influence of carbon, the ECU 10 just needs to execute the process of raising the temperature of the EHC 6 to the temperature range in which carbon is oxidized. This process is termed "second process". With such a method, it is possible to recover the insulation resistance while minimizing an increase in the fuel consumption resulting from a rise in the temperature of the EHC 6.

Figure 4:
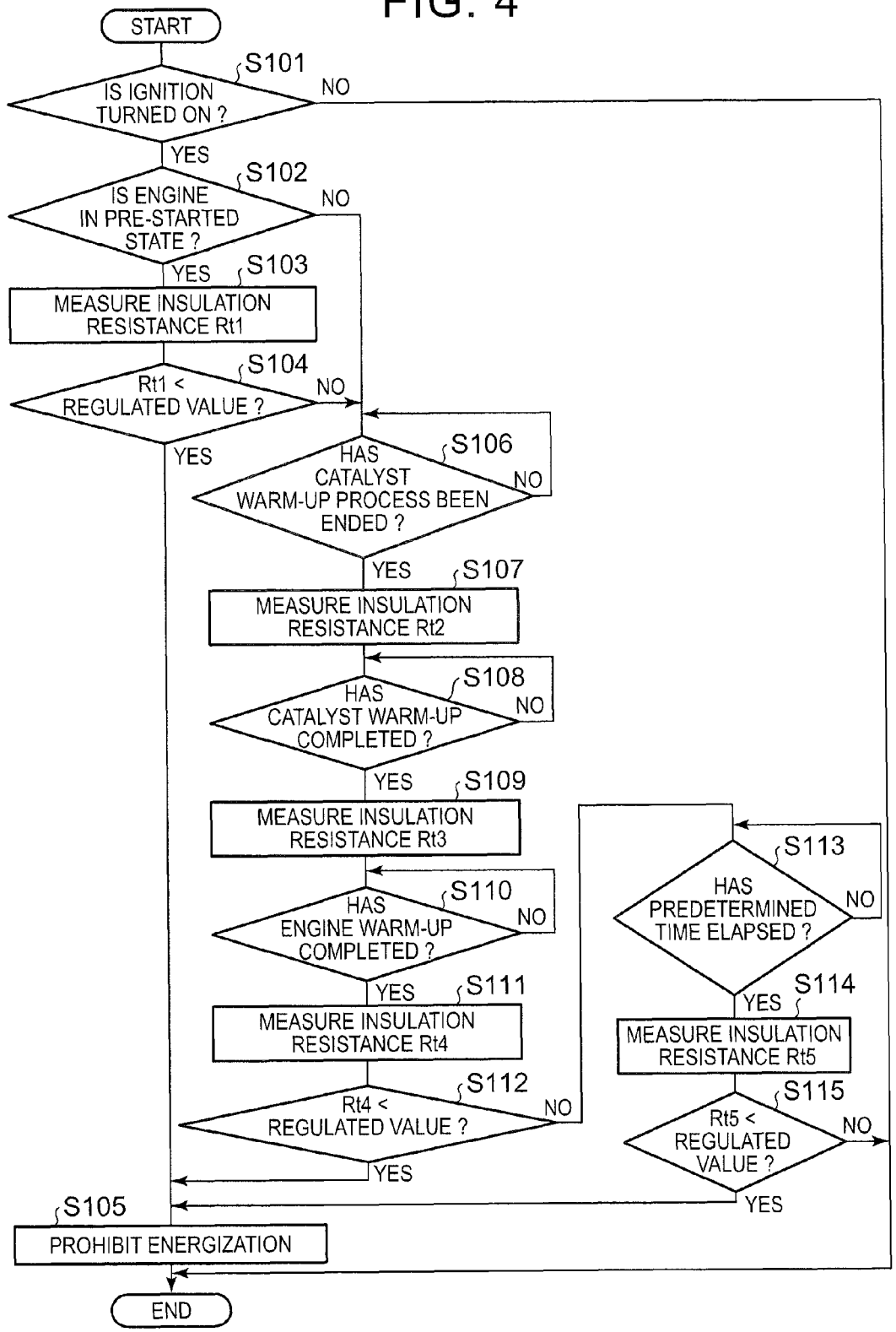
FIG. 4 is a flowchart that shows a processing routine that is executed by an ECU at the time when the insulation resistance is measured.
Figure 5:
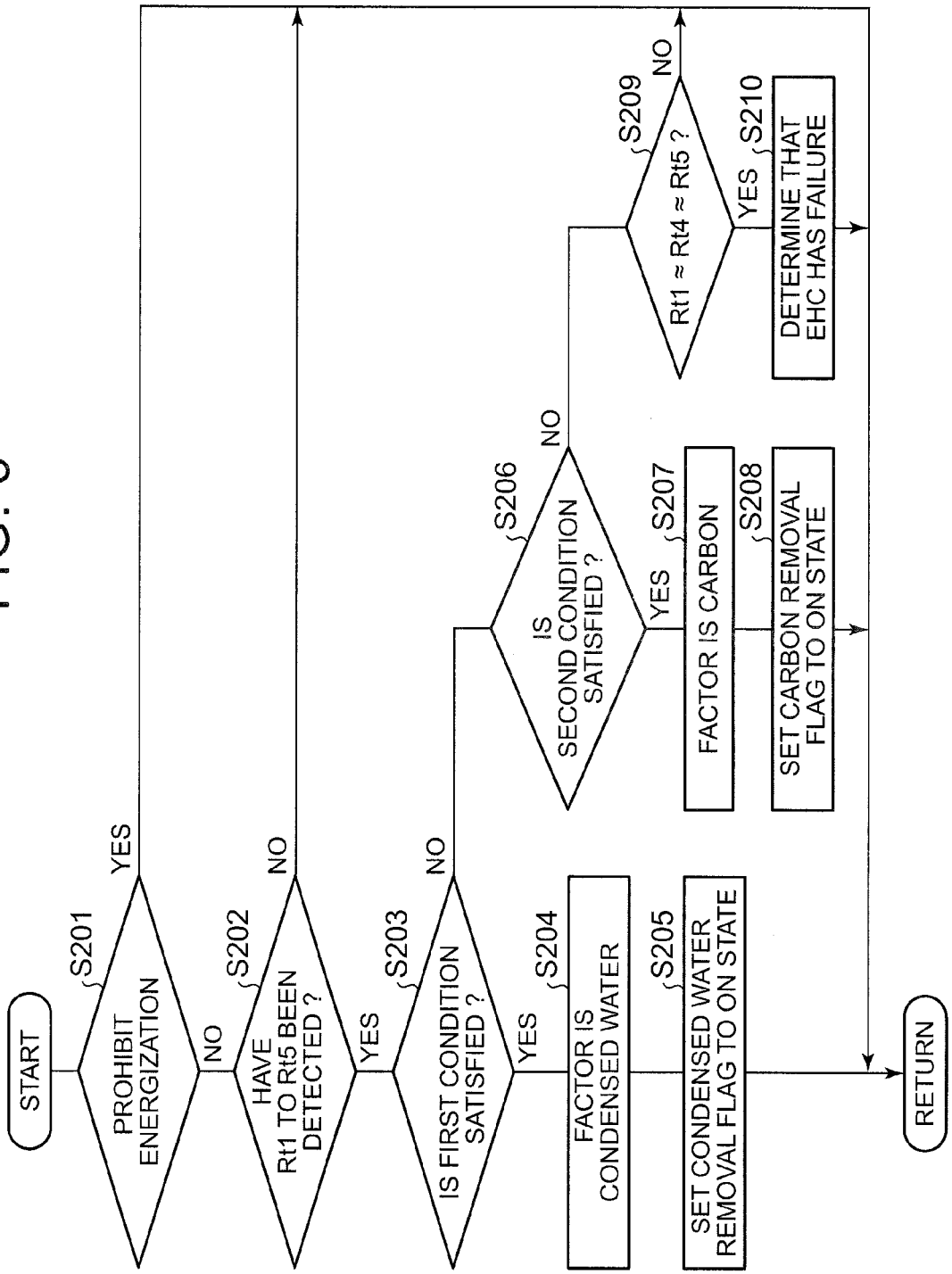
FIG. 5 is a flowchart that shows a processing routine that is executed by the ECU at the time when a factor causing a reduction in the insulation resistance is identified.
Figure 6:
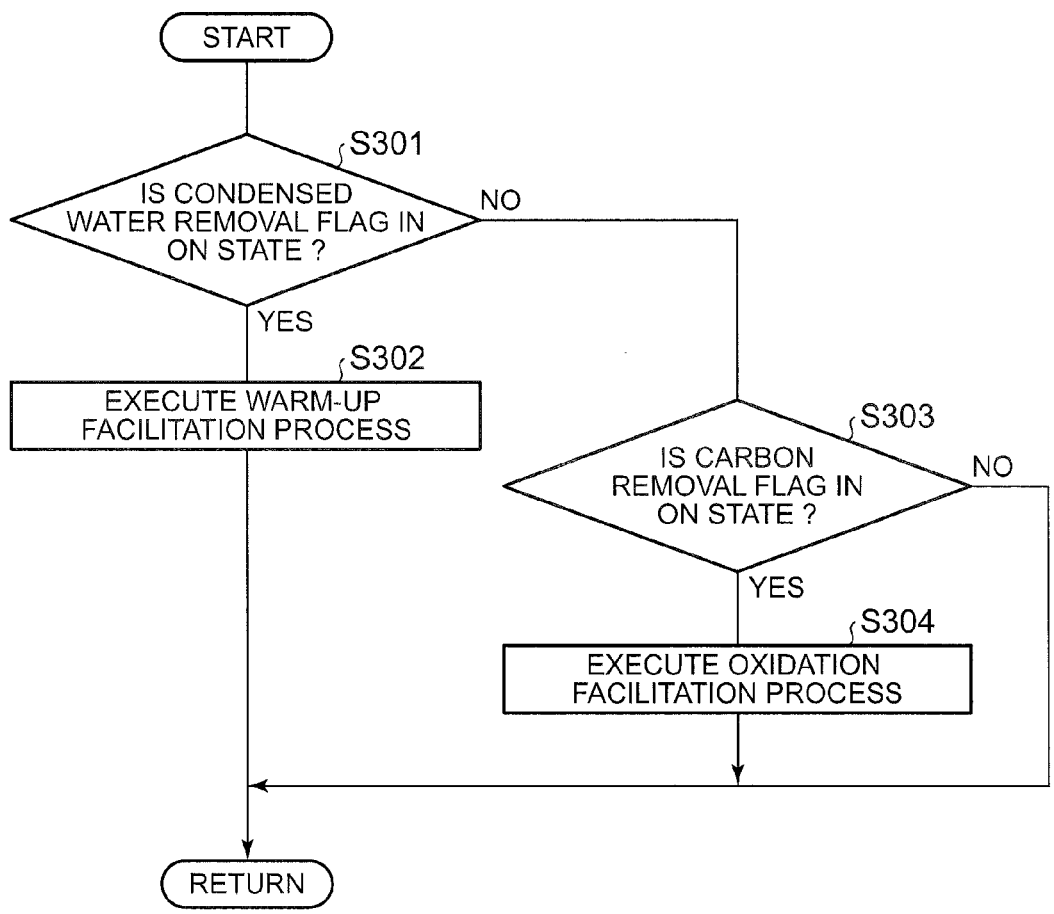
FIG. 6 is a flowchart that shows a processing routine that is executed by the ECU at the time when condensed water or carbon is removed from the EHC.

Here, the procedure of energization control over the EHC 6 according to the present embodiment will be described with reference to FIG. 4 to FIG. 6. FIG. 4 is a flowchart that shows a processing routine that is executed by the ECU 10 at the time when the insulation resistance is measured. The processing routine shown in FIG. 4 is a routine that is executed by the ECU 10 when the ignition switch 16 is turned on. FIG. 5 is a flowchart that shows a processing routine that is executed by the ECU 10 at the time when the factor causing a reduction in the insulation resistance is identified. FIG. 6 is a flowchart that shows a processing routine that is executed by the ECU 10 at the time when condensed water or carbon is removed from the EHC 6. The processing routines shown in FIG. 5 and FIG. 6 are periodically executed by the ECU 10 (CPU).

Initially, in the processing routine shown in FIG. 4, the ECU 10 determines in the process of S101 whether the ignition switch 16 is turned on. When negative determination is made in the process of S101, the ECU 10 once ends the routine. When affirmative determination is made in the process of S101, the ECU 10 proceeds to the process of S102.

In the process of S102, the ECU 10 determines whether the internal combustion engine 1 is in a pre-started state. Specifically, it is determined whether the fuel injection amount is zero and the engine rotation sped is zero. When affirmative determination is made in the process of S102, the ECU 10 proceeds to the process of S103.

In the process of S103, the ECU 10 loads a measured value of the detector 15, and stores the measured value in a backup RAM, or the like, as an insulation resistance Rt1 at the first timing T1.

In the process of S104, the ECU 10 determines whether the insulation resistance Rt1 loaded in S103 is smaller than a regulated value. The regulated value is a value determined in conformity with laws and regulations, and the like, and is regarded as a value at which energization should be prohibited when the insulation resistance becomes smaller than the regulated value. The regulated value is, for example, set to 1 MΩ. When affirmative determination is made in the process of S104, the ECU 10 proceeds to the process of S105, and prohibits energization of the EHC 6.

When negative determination is made in the process of S102 or S104, the ECU 10 proceeds to the process of S106. In the process of S106, the ECU 10 determines whether the catalyst warm-up process has been ended. The catalyst warm-up process is, for example, the process of raising the exhaust gas temperature through retardation of fuel injection timing in a compression-ignition internal combustion engine, retardation of ignition timing in a spark-ignition internal combustion engine, or the like, and is ended when the temperature of the EHC 6 has reached a temperature at which part of the functions of the catalyst supported on the catalyst carrier 61 is activated. The temperature of the EHC 6 is, for example, a measured value of the downstream-side temperature sensor 14. The part of the functions of the catalyst is, for example, an oxidation function. When negative determination is made in the process of S106, the ECU 10 executes the process of S106 again. On the other hand, when affirmative determination is made in the process of S106, the ECU 10 proceeds to the process of S107.

In the process of S107, the ECU 10 loads a measured value of the detector 15, and stores the measured value in the backup RAM as an insulation resistance Rt2 at T2.

In the process of S108, the ECU 10 determines whether a warm-up of the catalyst has completed. Specifically, the ECU 10 determines that a warm-up of the catalyst has completed when the temperature of the EHC 6 has reached the lowest temperature at which all the functions of the catalyst supported on the catalyst carrier 61 are activated. When negative determination is made in the process of S108, the ECU 10 executes the process of S108 again. On the other hand, when affirmative determination is made in the process of S108, the ECU 10 proceeds to the process of S109.

In the process of S109, the ECU 10 loads a measured value of the detector 15, and stores the measured value in the backup RAM as an insulation resistance Rt3 at T3.

In the process of S110, the ECU 10 determines whether a warm-up of the internal combustion engine 1 has completed. Specifically, the ECU 10 determines that a warm-up of the internal combustion engine 1 has completed when the temperature of the internal combustion engine 1 has reached the lowest temperature of a warm-up state. The temperature of the internal combustion engine 1 is, for example, the temperature of coolant or lubricant, and the lowest temperature of the warm-up state is, for example, set to 80° C. When negative determination is made in the process of S110, the ECU 10 executes the process of S110 again. On the other hand, when affirmative determination is made in the process of S110, the ECU 10 proceeds to the process of S111.

In the process of S111, the ECU 10 loads a measured value of the detector 15, and stores the measured value in the backup RAM as an insulation resistance Rt4 at T4.

In the process of S112, the ECU 10 determines whether the insulation resistance Rt4 loaded in S111 is smaller than the regulated value. When affirmative determination is made in S112, the ECU 10 proceeds to the process of S105, and prohibits energization of the EHC 6.

When negative determination is made in the process of S112, the ECU 10 proceeds to the process of S113, and determines whether a predetermined time has elapsed from when a warm-up of the internal combustion engine 1 has completed. The "predetermined time" is a time required to remove condensed water in the EHC 6 from when a warm-up of the internal combustion engine 1 has completed on the assumption that condensed water is present in the EHC 6. T5 may be determined by setting any one of the timings T1, T2, T3 as a starting point. That is, T5 may be set to the timing at which a time in which condensed water in the EHC 6 can be removed has elapsed from any one of the timings T1, T2, T3. When negative determination is made in the process of S113, the ECU 10 executes the process of S113 again. On the other hand, when affirmative determination is made in the process of S113, the ECU 10 proceeds to the process of S114.

In the process of S114, the ECU 10 loads a measured value of the detector 15, and stores the measured value in the backup RAM as an insulation resistance Rt5 at T5. When operation of the internal combustion engine 1 is stopped, that is, the ignition switch 16 is turned off, before the predetermined time elapses from when a warm-up of the internal combustion engine 1 has completed, a measured value of the detector 15 at the timing at which the ignition switch 16 is turned off may be stored in the backup RAM as an insulation resistance Rt5 at T5.

In the process of S115, the ECU 10 determines whether the insulation resistance Rt5 loaded in the process of S114 is smaller than the regulated value. When affirmative determination is made in S115, the ECU 10 proceeds to the process of S105, and prohibits energization of the EHC 6. On the other hand, when negative determination is made in S115, the ECU 10 once ends the routine.

In the processing routine shown in FIG. 4, the process of determining whether to prohibit energization of the EHC 6 is not executed for the insulation resistance Rt2 at T2 and the insulation resistance Rt3 at T3. This is because the insulation resistance Rt2 at T2 and the insulation resistance Rt3 at T3 can become smaller than the regulated value due to the influence of condensed water or carbon.

As described above, the ECU 10 executes the processing routine shown in FIG. 4. Thus, the measuring device according to the invention is implemented.

In the processing routine shown in FIG. 5, the ECU 10 initially determines in the process of S201 whether energization of the ECU 10 is prohibited. More specifically, the ECU 10 determines whether energization of the EHC 6 is prohibited in the processing routine shown in FIG. 4. When affirmative determination is made in S201, the ECU 10 once ends the processing routine. On the other hand, when negative determination is made in S201, the ECU 10 proceeds to the process of S202.

In the process of S202, the ECU 10 determines whether the insulation resistances Rt1, Rt2, Rt3, Rt4, Rt5 at T1 to T5 have been measured. When negative determination is made in S202, the ECU 10 once ends the processing routine. On the other hand, when affirmative determination is made in S202, the ECU 10 proceeds to the process of S203.

In the process of S203, the ECU 10 determines whether the above-described first condition is satisfied on the basis of the insulation resistances Rt1, Rt2, Rt3, Rt4, Rt5 stored in the backup RAM. When affirmative determination is made in S203, the ECU 10 proceeds to S204, and determines that the insulation resistance is reduced because of condensed water.

In the process of S205, the ECU 10 sets a condensed water removal flag to an on state. Specifically, the ECU 10 sets "1" in a storage area preset in the backup RAM.

When negative determination is made in the process of S203, the ECU 10 proceeds to the process of S206, and determines whether the above-described second condition is satisfied. When affirmative determination is made in the process of S206, the ECU 10 proceeds to the process of S207, and determines that the insulation resistance is reduced because of carbon.

In the process of S208, the ECU 10 sets a carbon removal flag to an on state. Specifically, the ECU 10 sets "1" in a storage area preset in the backup RAM.

When negative determination is made in the process of S206, the ECU 10 proceeds to the process of S209, and determines whether the insulation resistance Rt1 at T1 is substantially equal to the insulation resistance Rt4 at T4 and the insulation resistance Rt5 at T5. For example, the ECU 10 determines that Rt1, Rt4, Rt5 are substantially equal to each other when a difference between Rt1 and Rt4, a difference between Rt1 and Rt5 and a difference between Rt4 and Rt5 are smaller than or equal to a set value. When negative determination is made in the process of S209, the ECU 10 once ends the routine. On the other hand, when affirmative determination is made in the process of S209, the ECU 10 proceeds to the process of S210, and determines that the factor causing a reduction in the insulation resistance is a failure of the EHC 6. In this case, the ECU 10 executes the process of informing a vehicle driver of a failure of the EHC 6, for example, lighting an alarm lamp, indicating an alarm message, beeping an alarm sound, or the like.

The ECU 10 executes the processing routine shown in FIG. 5 in this way. Thus, determination means according to the invention is implemented. As a result, it is possible to determine whether the EHC 6 has a failure without raising the temperature of the EHC 6 to the temperature range in which moisture or carbon is removed. In the case where the EHC 6 has no failure, it is also possible to determine whether the factor causing a reduction in the insulation resistance is condensed water or carbon.

In the processing routine shown in FIG. 6, the ECU 10 initially determines in the process of S301 whether the condensed water removal flag is in the on state. When affirmative determination is made in S301, the ECU 10 proceeds to the process of S302.

In the process of S302, the ECU 10 executes a condensed water removal process. Specifically, the ECU 10 executes a method of raising the temperature of exhaust gas flowing into the EHC 6 by executing the process of retarding fuel injection timing or ignition timing, or increases heat of oxidation reaction of the catalyst by executing the process of supplying unburned fuel components and oxygen to the EHC 6. The process of supplying unburned fuel components and oxygen to the EHC 6 includes a plurality of examples. The process may be, for example, the process of correcting the air-fuel ratio to a rich side and supplying secondary air into exhaust gas, the process of injecting fuel into a cylinder in an expansion stroke or exhaust stroke, or the process of operating part of cylinders with air-fuel mixture having a lean air-fuel ratio and operating the remaining cylinders with air-fuel mixture having a rich air-fuel ratio. The condensed water removal process that is executed by any one of the above methods is ended at the timing at which the insulation resistance has become larger than or equal to a predetermined target value. The condensed water removal process is not effective even when it is executed after T5, so the condensed water removal process is executed after the next start of the internal combustion engine 1 and at the timing before T5.

When negative determination is made in the process of S301, the ECU 10 proceeds to the process of S303. In the process of S303, the ECU 10 executes a carbon removal process. Specifically, the ECU 10 raises the temperature of the EHC 6 and supplies the EHC 6 with oxygen required to oxidize carbon.

A similar method to that of the condensed water removal process may be used as a method of raising the temperature of the EHC 6. However, the temperature range in which carbon is oxidized is higher than the temperature range in which condensed water vaporizes, so a larger amount of heat or longer processing time is required than that of the condensed water removal process. A method of supplying secondary air into exhaust gas, a method of operating part of cylinders with air-fuel mixture having a rich air-fuel ratio and operating the remaining cylinders with air-fuel mixture having a lean air-fuel ratio, a method of causing the internal combustion engine 1 to carry out fuel-cut operation, or the like, may be used as a method of supplying oxygen to the EHC 6. The carbon removal process that is executed by any one of the above methods is ended at the timing at which the insulation resistance has become larger than or equal to a predetermined target value. The target value may be the same value as the target value in the above-described condensed water removal process or may be a different value.

A period in which the carbon removal process is executed may be longer than that of the condensed water removal process, so the interval at which the insulation resistance is measured in the carbon removal process may be longer than the interval at which the insulation resistance is measured in the condensed water removal process. In this case, it is possible to reduce the electric power consumption required to measure the insulation resistance. Carbon in the EHC 6 is highly likely to remain after T5 as well, so the above-described carbon removal process may be executed after T5.

According to the above-described first embodiment, it is possible to determine whether the EHC 6 has a failure without raising the temperature of the EHC 6 to the temperature range in which condensed water or carbon is removed. As a result, it is possible to determine whether the EHC 6 has a failure while suppressing an increase in the fuel consumption resulting from a rise in the temperature of the EHC 6. According to the first embodiment, when the insulation resistance reduces because of the influence of condensed water or carbon, it is possible to determine whether the factor causing the reduction is condensed water or carbon. As a result, it is possible to execute the process based on the factor causing a reduction in the insulation resistance, so it is possible to minimize an increase in fuel consumption resulting from removal of condensed water or carbon. For example, when the insulation resistance is reduced because of the influence of condensed water, it is not required to raise the temperature of the EHC 6 to the temperature range in which carbon can be removed in addition to condensed water, so it is possible to minimize an increase in the fuel consumption.

A second embodiment of a control system for an electrical heating catalyzer according to the invention will be described with reference to FIG. 7. A configuration different from that of the above-described first embodiment will be described, and the description of a similar configuration is omitted.

The present embodiment differs from the above-described first embodiment in the method of identifying the factor causing a reduction in the insulation resistance in the case where so-called short trip operation, in which operation of the internal combustion engine 1 is stopped before the insulation resistance Rt3 at t3 or the insulation resistance Rt4 at T4 is measured, is carried out.

The driver of the vehicle may stop the operation of the internal combustion engine 1 before a warm-up of the catalyst supported on the catalyst carrier 61 completes or before a warm-up of the internal combustion engine 1 completes. In such a case, it is not possible to detect the insulation resistance Rt3 at T3 or the insulation resistance Rt4 at T4. As a result, when the EHC 6 has no failure, it may not be possible to determine whether the factor causing a reduction in the insulation resistance is condensed water or carbon.

In contrast, in the present embodiment, the ECU 10 identifies the factor causing a reduction in the insulation resistance on the basis of the insulation resistance Rt1 at the first timing T1 when the number of times the above-described short trip operation is carried out, that is, the number of times operation of the internal combustion engine 1 is stopped before the insulation resistance Rt3 at T3 or the insulation resistance Rt4 at T4 is detected has reached a set number of times or larger.

Hereinafter, the procedure of identifying the factor causing a reduction in the insulation resistance in the case where short trip operation is repeated will be described with reference to FIG. 7. FIG. 7 is a flowchart that shows the processing routine that is executed by the ECU 10 at the time when the factor causing a reduction in the insulation resistance is identified. The processing routine shown in FIG. 7 is a processing routine that is stored in the ROM of the ECU 10 in advance and that is executed by the ECU 10 when the ignition switch 16 is turned on.

Figure 7:
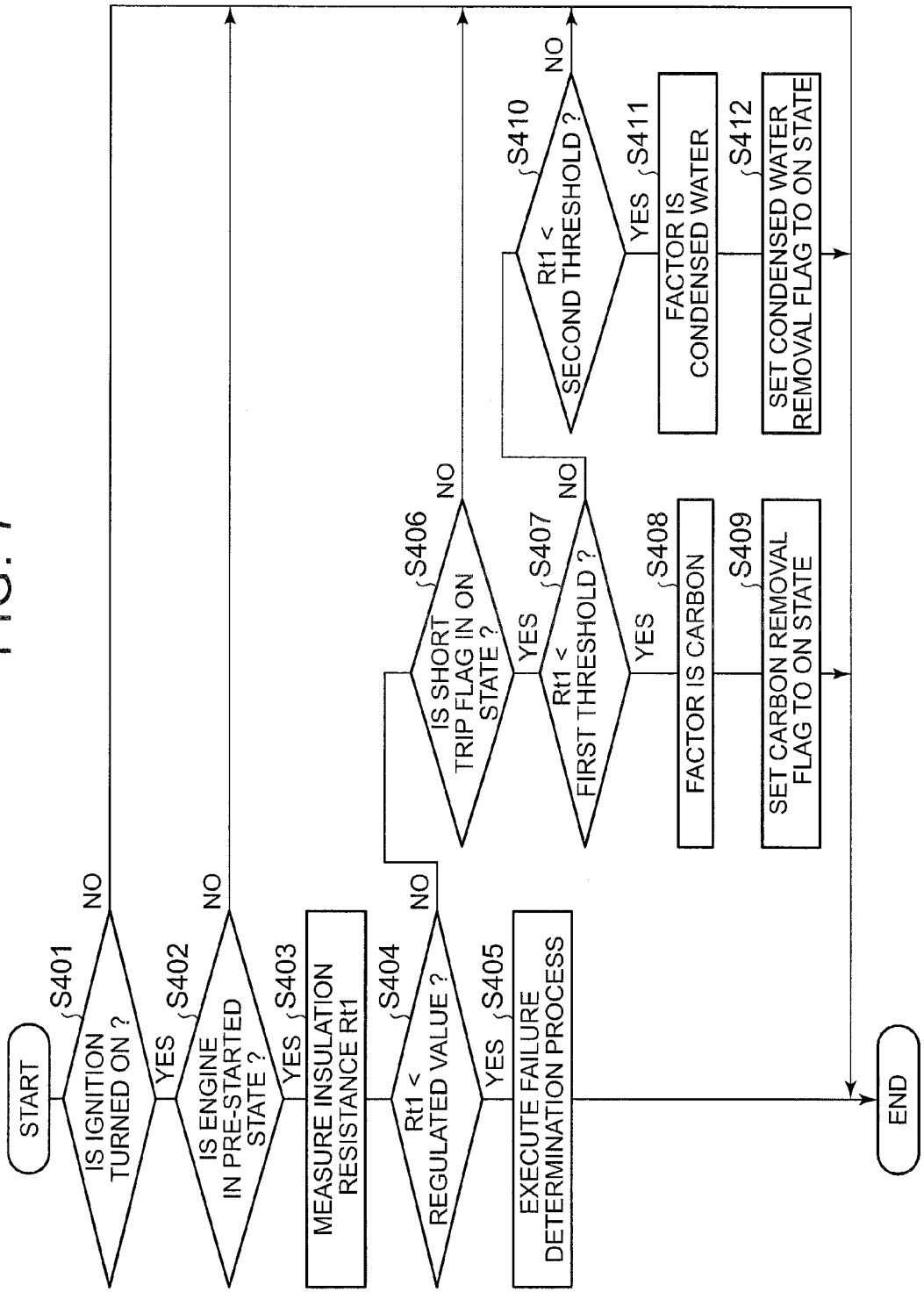
FIG. 7 is a flowchart that shows a processing routine that is executed by the ECU at the time when the factor causing a reduction in the insulation resistance is identified in the case where short trip operation is repeated.

In the processing routine shown in FIG. 7, the ECU 10 determines in the process of S401 whether the ignition switch 16 is turned on. When negative determination is made in the process of S401, the ECU 10 ends the routine. On the other hand, when affirmative determination is made in the process of S401, the ECU 10 proceeds to the process of S402.

In the process of S402, the ECU 10 determines whether the internal combustion engine 1 is in a pre-started state. When negative determination is made in the process of S402, the ECU 10 ends the routine. On the other hand, when affirmative determination is made in the process of S402, the ECU 10 proceeds to the process of S403.

In the process of S403, the ECU 10 loads a measured value of the detector 15, and stores the measured value in the backup RAM, or the like, as the insulation resistance Rt1 at the first timing T14.

In the process of S404, the ECU 10 determines whether the insulation resistance Rt1 measured in the process of S403 is smaller than the regulated value. When affirmative determination is made in the process of S404, the ECU 10 proceeds to the process of S405, and executes a failure determination process. The "failure determination process" is a process of determining that the EHC 6 has a failure when the variation width of the insulation resistance continuously or intermittently measured by the detector 15 is smaller than or equal to a set value in the period from when the ignition switch 16 is turned on (T1) to when the catalyst warm-up process completes (T2). The "failure determination process" is a process of determining that the EHC 6' has a failure when a difference between the insulation resistances Rt1, Rt2, Rt5 respectively measured by the detector 15 at T1, T2, T5 is smaller than or equal to a set value. In this case, T5 is the timing at which the ignition switch 16 is turned off.

When negative determination is made in S404, the ECU 10 proceeds to the process of S406. In the process of S406, the ECU 10 determines whether a short trip flag is in an on state. The short trip flag is a storage area preset in the backup RAM of the ECU 10. When the number of times operation of the internal combustion engine 1 is stopped has reached a set number of times before the insulation resistance Rt3 at T3 or the insulation resistance Rt4 at T4 is measured, "1" is set, and the short trip flag is set to the on state.

When negative determination is made in S406, the ECU 10 ends the routine. On the other hand, when affirmative determination is made in S406, the ECU 10 proceeds to the process of S407. In the process of S407, the ECU 10 determines whether the insulation resistance Rt1 measured in the process of S403 is smaller than a first threshold. The first threshold is a value larger than the regulated value, and corresponds to a minimum value that can be taken by the insulation resistance Rt1 at T1 when no carbon has accumulated between the catalyst carrier 61 and the case 62 and condensed water has accumulated between the catalyst carrier 61 and the case 62. The first threshold is, for example, set to 5 MΩ.

When affirmative determination is made in S407, the ECU 10 proceeds to the process of S408, and determines that the insulation resistance is reduced because of carbon. Subsequently, the ECU 10 proceeds to the process of S409, and sets the carbon removal flag to the on state.

When negative determination is made in the process of S407, the ECU 10 proceeds to the process of S410. In the process of S410, the ECU 10 determines whether the insulation resistance Rt1 measured in the process of S403 is smaller than a second threshold. The second threshold is a value larger than the first threshold, and corresponds to a value obtained by adding a margin to a maximum value that can be taken by the insulation resistance Rt1 at T1 when no carbon has accumulated between the catalyst carrier 61 and the case 62 and condensed water has accumulated between the catalyst carrier 61 and the case 62. The second threshold is, for example, set to 10 MΩ.

When negative determination is made in the process of S410, the ECU 10 ends the routine. On the other hand, when affirmative determination is made in the process of S410, the ECU 10 proceeds to the process of S411. In the process of S411, the ECU 10 determines that the insulation resistance is reduced because of condensed water. Subsequently, the ECU 10 proceeds to the process of S412, and sets the condensed water removal flag to the on state. In this case, it is possible to execute the condensed water removal process immediately after the internal combustion engine 1 is started, so it is possible to quickly remove condensed water in the EHC 6.

According to the above-described embodiments, even when short trip operation is repeated, it is possible to identify the factor causing a reduction in the insulation resistance.

The ECU 10 may execute the condensed water removal process on the assumption that the factor causing a reduction in the insulation resistance Rt is condensed water when the number of times short trip operation is carried out, that is, the number of times operation of the internal combustion engine 1 is stopped before the insulation resistance Rt3 at T3 or the insulation resistance Rt4 at T4 is detected, has reached a set number of times. In this case, it is possible to reduce opportunities that energization of EHC 6 is prohibited while reducing an increase in the fuel consumption.

What is claimed is:

1. A control system comprising:
   an electrical heating catalyzer arranged in an exhaust passage of an internal combustion engine, the electrical heating catalyzer including
      a catalyst carrier configured to generate heat through energization,
      a case configured to accommodate the catalyst carrier, and
      an electrical insulating member arranged between the catalyst carrier and the case;
   a measuring device configured to measure an insulation resistance between the catalyst carrier and the case; and
   an electronic control unit configured to determine whether the electrical heating catalyzer has a failure based on of a historical variation in the insulation resistance measured by the measuring device, wherein
   the electronic control unit is further configured to execute a first process or a second process, the first process being a process of removing condensed water from the electrical heating catalyzer, and the second process being a process of removing carbon from the electrical heating catalyzer, and
   in a case where the electronic control unit has determined that the electrical heating catalyzer has no failure, the electronic control unit is further configured to:
      execute the first process when the insulation resistance measured by the measuring device reduces after combustion engine is started and then increases to an appropriate value; and
      execute the second process when the insulation resistance measured by the measuring device reduces after internal combustion engine is started and then increase to the appropriate value.

2. The control system according to claim 1, wherein
   the electronic control unit is further configured to determine that the electrical heating catalyzer has a failure when a variation width of the insulation resistance measured by the measuring device in a predetermined period is less than or equal to a set value.

3. The control system according to claim 2, wherein the predetermined period at least includes a period from when an ignition switch is turned on to when a warm-up of the electrical heating catalyzer completes.

4. The control system according to claim 2, wherein
   the measuring device is further configured to intermittently measure the insulation resistance in the predetermined period, and
   the electronic control unit is further configured to determine that the electrical heating catalyzer has a failure when a difference between a plurality of the insulation resistances measured by the measuring device is less than or equal to a set value.

5. The control system according to claim 3, wherein
   the measuring device is further configured to intermittently measure the insulation resistance in the predetermined period, and
   the electronic control unit is further configured to determine that the electrical heating catalyzer has a failure when a difference between a plurality of the insulation resistances measured by the measuring device is smaller less than or equal to a set value.

6. The control system according to claim 1, wherein
   the measuring device is configured to measure the insulation resistance at a first timing through a fifth timing,
   the first timing is timing at which the ignition switch is turned on,
   a second timing is timing at which a catalyst warm-up process after the internal combustion engine is started is ended,
   a third timing is timing at which a warm-up of the electrical heating catalyzer completes,
   a fourth timing is timing at which a warm-up of the internal combustion engine completes,
   the fifth timing is timing at which a predetermined time has elapsed from the completion of warm-up of the internal combustion engine, and
   the electronic control unit is further configured to execute the first process when all of following conditions i), ii), and iii) are satisfied, and execute the second process when all of following conditions i), iv), and v) are satisfied,
   i) the insulation resistance measured at the second timing is less than the insulation resistance measured at the first timing,
   ii) the insulation resistance measured at the fourth timing or the insulation resistance measured at the fifth timing is greater than the insulation resistance measured at the third timing,
   iii) a difference between the insulation resistance measured at the first timing and the insulation resistance measured at the fifth timing is less than a predetermined value,
   iv) the insulation resistance measured at the third timing is less than the insulation resistance measured at the second timing, and
   v) the insulation resistance measured at the fifth timing is smaller less than the insulation resistance measured at the first timing.

7. The control system according to claim 6, wherein
   the electronic control unit is further configured to count the number of times the internal combustion engine is stopped before the insulation resistance at any one of the third timing, the fourth timing, and the fifth timing is measured, and
   the electronic control unit is further configured to execute the second process when following conditions vi) and vii) are satisfied, and execute the first process when following conditions vi) and viii) are satisfied,
   vi) the number of times counted by the electronic control unit is greater than or equal to a set number of times, vii) the insulation resistance at the first timing is less than a first threshold, and viii) the insulation resistance at the first timing is less than a second threshold larger than the first threshold.

8. A control method for an electrical heating catalyzer, the electrical heating catalyzer being arranged in an exhaust passage of an internal combustion engine, the electrical heating catalyzer including a catalyst carrier, a case and an electrical insulating member, the catalyst carrier generating heat through energization, the case accommodating the catalyst carrier, the electrical insulating member being arranged between the catalyst carrier and the case, the control method comprising:

measuring an insulation resistance between the catalyst carrier and the case with the use of a measuring device;

determining, by an electronic control unit, whether the electrical heating catalyzer has a failure based on a historical variation in the insulation resistance;

executing a first process or a second process, the first process being a process of removing condensed water from the electrical heating catalyzer and the second process being a process of removing carbon from the electrical heating catalyzer; and in a case where the electronic control unit has determined that the electrical heating catalyzer has no failure:

executing the first process when the insulation resistance measured by the measuring device reduces after the internal combustion engine is started and then increases to an appropriate value, and executing the second process when the insulation resistance measured by the measuring device reduces after the internal combustion engine is started and then does not increase to the appropriate value.

* * * * *